United States Patent Office 2,792,374
Patented May 14, 1957

2,792,374

AQUEOUS DEFOAMANTS

John S. Bradley V, Pitman, and John J. Giammaria, Woodbury, N. J., assignors to Socony Mobil Oil Company, Inc., a corporation of New York No Drawing. Application January 14, 1953,
Serial No. 331,326

6 Claims. (Cl. 252—358)

This invention relates to antifoam agents. It is more particularly concerned with the inhibition of foam in aqueous systems.

As is known to those familiar with the art, the occurrence of foaming in aqueous systems gives rise to severe industrial problems. Thus, in aqueous systems, such as are encountered in paper, glue, fermentation and like industries, foaming during agitation makes for difficulty in handling the processes; and even decreases efficiencies and yields.

It has now been found that foaming in aqueous systems can be inhibited by a simple and economical method. It has been discovered that by the addition of certain phosphonic or phosphinic acids, esters and salts to aqueous systems, in small amounts, foaming thereof is greatly reduced.

Accordingly, it is an object of this invention to provide a method for inhibiting foaming in aqueous systems. Another object is to provide aqueous systems having reduced foaming tendencies. A specific object is to provide aqueous systems, which are prone to foam, containing minor amounts of a phosphorus compound of the class; phosphonate esters, salts of phosphonate monoesters, phosphinic acids, or salts of phosphinic acids. Another specific object is to provide a method for reducing foaming tendencies in an aqueous system, which comprises adding thereto one or more of the aforementioned phosphorus compounds. Other objects and advantages of this invention will become apparent to those skilled in the art, from the following detailed description.

The present invention provides an aqueous system subject to foaming containing a small amount, sufficient to reduce the foaming thereof, of at least one phosphorus-containing compound selected from the group consisting of (A) a compound having the formula

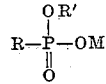

wherein R is a radical selected from the group consisting of an alkyl radical, a trihalomethyl radical, a cycloalkyl radical, a terpenyl radical, an aralkyl radical, and an aryl radical; R' is a lower alkyl radical; and M is a radical selected from the group consisting of an alkali metal and R'; and (B) a compound having the formula

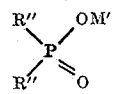

wherein R" is a radical selected from the group consisting of an alkyl radical and a carboxyalkyl radical, and M' is a radical selected from the group consisting of a hydrogen atom and an alkali metal.

The defoamants utilizable in the present invention are in the general class of phosphinic and phosphonic acids, and their derivatives. Only specific members of this class are utilizable, however, as is discussed hereinafter.

One group of additives contemplated can be represented by the formula

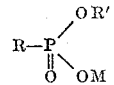

wherein R is an alkyl radical, a trihalomethyl radical, a cycloalkyl radical, a terpenyl radical, an aralkyl radical, or an aryl radical; R' is a lower alkyl radical; and M is an alkali metal or R'. In the above formula, it is preferred that R contain between about 1 carbon atom and about 24 carbon atoms and, more preferably, between about 6 carbon atoms and about 10 carbon atoms. The lower alkyl radicals, R', contain between one carbon atom and 5 carbon atoms. The alkali metals, of course, are those of group I of the periodic chart of the elements. Sodium and potassium are preferred.

As will be apparent from the formula, the compounds contemplated thereby are diesters of phosphonic acids and alkali-metal salts of monoesters of phosphonic acids. Non-limiting examples of these compounds, in addition to those of the working examples, are diethyl ethanephosphonate, di-t-butyl pentanephosphonate, dipropyl hexanephosphonate, dimethyl pentane-3-phosphonate, diisoamyl methylcyclohexanephosphonate, dipropyl tetracosanephosphonate, dimethyl phenylbutanephosphonate, dibutyl naphthylethanephosphonate, diisopropyl naphthalenephosphonate, sodium monopropyl hexanephosphonate, lithium monoethyl ethanephosphonate, potassium monoamyl pentanephosphonate, rubidium monopropyl hexanephosphonate, sodium monomethyl pentane-3-phosphonate, potassium monobutyl methylcyclohexanephosphonate, sodium monoisopropyl tetracosanephosphonate, potassium monomethyl phenylbutanephosphonate, lithium monobutyl naphthylethanephosphonate, and sodium mono-t-butyl naphthalenephosphonate.

The other class of phosphorus compounds contemplated herein is represented by the formula

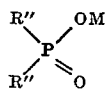

wherein R″ is an alkyl radical or a carboxyl-substituted alkyl radical (i. e., one derived from a fatty acid), and M is hydrogen or an alkali metal. It is preferred that R″ contain between about 3 carbon atoms and about 20 carbon atoms.

It will be noted from the formula that this class of compounds include dialkylphosphinic acids and their alkali metal salts, and di(carboxyalkyl) phosphinic acids and their alkali metal salts. Non-limiting examples thereof are dipropylphosphinic acid, sodium dipropylphosphinate, diisoamylphosphinic acid, potassium diisoheptylphosphinate, di(2-ethylhexyl)phosphinic acid, lithium dinonylphosphinate, didecylphosphinic acid, rubidium didodecylphosphinate, di(carboxyethyl)phosphinic acid, sodium di(carboxyamyl)phosphinate, di(carboxydecyl)phosphinic acid, potassium di(carboxytridecyl)phosphinate, di(carboxypentadecyl)phosphinic acid, sodium di(carboxyheptadecyl)phosphinate, etc.

Various methods are known to the art for producing the phosphorus compounds utilized in this invention. Thus, phosphonic acids have been produced by reacting a hydrocarbon with phosphorus trichloride (U. S. Patent No. 2,137,792). Esters have been made by reacting sodium salts of phosphites with organic halides (U. S. Patent No. 2,397,422). A novel method for producing the phosphorus compounds is to react a phosphorus compound having hydrogen on phosphorus with an unsaturated compound under free-radical conditions, as disclosed in co-pending application Serial No. 107,376, filed July 28, 1949. See also additional prior art processes set forth in that application. It must be understood, however, that the method of preparing these phosphorus compounds does not affect this invention. Any phosphorus compounds having the structures set forth hereinbefore are effective, regardless of how they are prepared.

It is also within the purview of this invention to use combinations of the aforediscussed phosphorous compounds. In general preferred practice, two phosphorous compounds will be used in equal parts by weight, i. e., in a 50–50 mixture. It must be understood, however, that other proportions in the mixture can be used, as low as a few percent, by weight, of one component of the mixture. Thus, mixtures, such as 2–98, 10–90, 40–60, etc. are within the scope of this invention. Mixtures of dialkyl alkanephosphonates and sodium dialkylphosphinate are particularly effective.

The effectiveness of the phosphorus compounds, or mixtures thereof, will vary somewhat in different aqueous systems. The choice of a single suitable compound or mixture can be established readily by testing in a given system. The concentration of defoamant used will vary between about 0.001 percent and about 1.0 percent, by weight, based upon the weight of the aqueous system. In preferred practice, satisfactory reduction of foaming tendencies is achieved with an additive concentration of between about 0.001 percent and about 0.1 percent, by weight.

The defoamants can be added to the aqueous system directly, or in the form of dispersions or solutions. In either event, the concentrations defined hereinbefore refer to actual concentration of phosphorus compounds exclusive of the solvent or dispersant. It is to be noted that the solvents or dispersants themselves exert no defoaming action. Suitable solvents or dispersants are water, ethanol, butanol, dioxane, benzene, toluene, xylene, etc.

The following specific working examples are for the purpose of illustrating the defoamant compositions of this invention. It must be strictly understood that this invention is not to be limited to the particular defoamants, systems, or concentrations used in the examples. Those skilled in the art will appreciate that a wide variety of other compositions can be used, as described hereinbefore.

The foaming test utilized herein is similar to that described by C. W. Foulk and J. N. Miller in Ind. Eng. Chem., 23, 1283 (1931). The apparatus consists of a 1.5-liter graduated cylinder, the base of which consists of a sintered glass disc which is connected to an air line regulated to deliver air at the rate of 100 milliliters per minute. In conducting the test, air is blown through a 100-milliliter sample of the aqueous system, for 10 minutes. At the end of this period, the volume of foam is noted. The defoamant, when used, is added to the surface of the aqueous system. The volume of foam is reported as the difference between the foam level and the liquid level.

In all of the examples, except Example 14, a 0.05 weight percent aqueous solution of saponin was used as the foamant aqueous system. In Example 14, however, the saponin solution was adjusted to a pH of 4.3, in order to approximate an acidic foamant system.

EXAMPLES 1 THROUGH 13

Various dialkyl phosphonates were added to samples of the 0.05-percent saponin solution, both with and without dispersants (solvents). Each blend was subjected to the foam test. Pertinent data on the compositions and test results are set forth in Table I.

EXAMPLE 14

A portion of the saponin solution was buffered to pH 4.3 with potassium acid phthalate. This solution gave 920 milliliters of foam in the foam test. Then 0.05 percent, by weight, of dibutyl octane-2-phosphonate was added to the acidic solution. The amount of foam then given in the foam test was only 2 milliliters.

EXAMPLES 15 THROUGH 17

Various alkali-metal monoalkyl phosphonates were added to portions of the 0.05-percent saponin solution, using dispersants. Each blend was subjected to the foam test. Pertinent data on the compositions and test results are set forth in Table I.

EXAMPLES 18 AND 19

Various phosphinic acids were added to portions of the 0.05-percent saponin solution, using dispersants. Each blend was subjected to the foam test. Pertinent data on the compositions and test results are set forth in Table I.

EXAMPLES 20 AND 21

Various alkali-metal salts of phosphinic acids were added to portions of the 0.05-percent saponin solution, using dispersants. Each blend was subjected to the foam test. Pertinent data on the compositions and test results are set forth in Table I.

EXAMPLES 22 AND 23

Various 50–50 mixtures of phosphonate esters and alkali-metal phosphinate or phosphonate salts were added to portions of the 0.05-percent saponin solution, using dispersants. Each blend was subjected to the foam test. Pertinent data on the compositions and test results are set forth in Table I.

Although the present invention has been described in conjunction with preferred embodiments, it is to be understood that modifications and variations may be resorted to, without departing from the spirit and scope of this invention, as those skilled in the are will readily understand. Such variations and modifications are considered to be within the purview and scope of the appended claims.

Table I.—Foam tests in 0.05% aqueous saponin solutions

| Example | Phosphorus Compound | Concn., Wt. Percent (1) | Dispersant | Ml. foam at 10 min. |
|---|---|---|---|---|
|  | Blank | | | 920 |
| 1 | Dibutyl ethanephosphonate | 0.05 | None | 745 |
|  | ....do.... | 0.05 | n-butanol | 595 |
| 2 | Dibutyl n,butanephosphonate | 0.05 | None | 380 |
|  | ....do.... | 0.05 | n-butanol | 540 |
| 3 | Dibutyl octane-2-phosphonate | 0.05 | None | 16 |
|  | ....do.... | 0.05 | n-butanol | 32 |
|  | ....do.... | 0.05 | dioxane | 12 |
| 4 | Dibutyl isooctanephosphonate | 0.05 | None | 30 |
|  | ....do.... | 0.05 | n-butanol | 20 |
| 5 | Dibutyl isononanephosphonate | 0.05 | None | 105 |
|  | ....do.... | 0.05 | n-butanol | 35 |
| 6 | Diethyl n-dodecanephosphonate | 0.05 | None | 110 |
|  | ....do.... | 0.05 | n-butanol | 310 |
| 7 | Dibutyl n-octadecanephosphonate | 0.05 | None | 670 |
| 8 | Dibutyl C20 alkanephosphonate (2) | 0.05 | ....do.... | 310 |
| 9 | Dibutyl cyclohexanephosphonate | 0.05 | ....do.... | 26 |
|  | ....do.... | 0.05 | n-butanol | 20 |
| 10 | Dibutyl pinanephosphonate | 0.05 | None | 58 |
| 11 | Dibutyl phenylmethanephosphonate | 0.05 | ....do.... | 475 |
|  | ....do.... | 0.05 | n-butanol | 285 |
| 12 | Dibutyl trichloromethanephosphonate | 0.05 | None | 22 |
| 13 | Diallyl benzenephosphonate | 0.10 | n-butanol | 385 |
| 15 | Na monobutyl octane-2-phosphonate | 0.05 | ....do.... | 190 |
|  | ....do.... | 0.05 | H2O+dioxane | 50 |
| 16 | Na monobutyl C20 alkanephosphonate (2) | 0.05 | n-butanol | 125 |
| 17 | Na monobutyl C24 alkanephosphonate (2) | 0.05 | ....do.... | 50 |
| 18 | Dioctadecylphosphinic acid | 0.05 | benzene | 470 |
| 19 | Di (carboxyheptadecane) phosphinic acid | 0.05 | n-butanol | 185 |
| 20 | Na dipentadecylphosphinate (2) | 0.05 | ....do.... | 110 |
| 21 | Na dioctadecylphosphinate | 0.05 | ....do.... | 70 |
|  | Dibutyloctane-2-phosphonate, 50-50 mixture | 0.05 | ....do.... | 0 |
| 22 | Na dioctadecyl phosphinate, 50-50 mixture | 0.01 | ....do.... | 5 |
|  | ....do.... | 0.05 | ....do.... | 35 |
| 23 | Dibutyl octane-2-phosphonate, 50-50 mixture / Na monobutyl C24 alkanephosphonate, 50-50 mixture. | 0.01 | ....do.... | 5 |

(1) Concentration of phosphorus compound. Dispersant not included.
(2) Compounds were prepared from olefins obtained from wax cracking.

What is claimed is:

1. An aqueous system subject to foaming containing a small amount, sufficient to reduce the foaming thereof, of at least one phosphorus-containing compound selected from the group consisting of (A) a compound having the formula

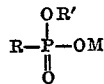

wherein R is a radical selected from the group consisting of an alkyl radical, a trihalomethyl radical, a cycloalkyl radical, a terpenyl radical, an aralkyl radical, and an aryl radical; R' is a lower alkyl radical; and M is a radical selected from the group consisting of an alkali metal and R'; and (B) a compound having the formula

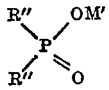

wherein R" is a radical selected from the group consisting of an alkyl radical and a carboxyalkyl radical, and M' is a radical selected from the group consisting of a hydrogen atom and an alkali metal.

2. An aqueous system subject to foam containing between about 0.001 percent, by weight, and about 1 percent, by weight, of dibutyl octane-2-phosphonate.

3. An aqueous system subject to foam containing between about 0.001 percent, by weight, and about 1 percent, by weight, of dibutyl cyclohexanephosphonate.

4. An aqueous system subject to foam containing between about 0.001 percent, by weight, and about 1 percent, by weight, of dibutyl trichloromethanephosphonate.

5. An aqueous system subject to foam containing between about 0.001 percent, by weight, and about 1 percent, by weight, of sodium monobutyl octane-2-phosphonate.

6. An aqueous system subject to foam containing between about 0.001 percent, by weight, and about 1 percent, by weight, of a 50-50 mixture by weight of dibutyl octane-2-phosphonate and sodium dioctadecylphosphinate.

References Cited in the file of this patent

UNITED STATES PATENTS

| 2,407,589 | Tremain et al. | Sept. 10, 1946 |
| 2,682,522 | Coover et al. | June 29, 1954 |
| 2,708,204 | Bell et al. | May 10, 1955 |

FOREIGN PATENTS

| 526,690 | Great Britain | Sept. 24, 1940 |
| 660,918 | Great Britain | Nov. 14, 1951 |
| 903,886 | France | Oct. 19, 1945 |